Patented Mar. 11, 1930

1,750,371

UNITED STATES PATENT OFFICE

HERBERT GILES TANNER, OF EUGENE, OREGON

COMPOSITION OF MATTER FOR COLORING FLAMES

No Drawing.    Application filed June 1, 1925. Serial No. 34,229.

The object of my invention is the production of a composition of matter which on being added to a fire such as a camp-fire, fireplace-fire, and the like, will artistically color the flames for a considerable period of time.

I am aware that various compounds and elements have been used to produce colored flames, such as for example copper, sodium, barium, lithium, zinc, boron, and many others in various forms and mixture, but such have the disadvantage in that the time period of producing a colored flame is comparatively short. My invention deals with such substances broadly and relates particularly to the preparation of a composition of matter which will color a flame more permanently. For the sake of brevity it is sufficient to consider copper as illustrative and as equivalent to this type of substance.

I have found that better results than ever before can be obtained by using chemically combined copper, such as for example copper sulphate, copper oxide, copper sulphide, copper chloride, etc., as well as by using finely divided copper itself, mixed with one or more chlorides less volatile than ammonium chloride, such as for example zinc chloride, calcium chloride, magnesium chloride, strontium chloride, barium chloride, tin chloride, potassium chloride, sodium chloride, etc.

The prolonged effect which is the object of my invention, is further enhanced by using the composition of matter in the shape of lumps, as opposed to the use of grains. By the word lumps I mean to include irregularly shaped pieces as well as those definitely shaped. By using the composition of matter in the form of lumps the rate which the color producing portion can volatilize is thereby reduced with consequent lengthening of the time during which the flame is colored. In shaping the composition of matter into lumps I have made use of cementing materials such as plaster of Paris, tar, starch, Portland cement, clay, water-glass, etc.

I have also found that the presence of an inert ingredient such as clay, plaster of Paris, charcoal, etc., retards volatilization of the color producing portion, thus prolonging the color effects.

As an example of the composition of matter which I have invented and which is the subject of this application for patent, I submit the following: 4 chemical equivalents of slowly volatile chloride or chlorides, 1 chemical equivalent of finely divided metallic copper or chemically combined copper, inert material and cementing material equal in bulk to the other ingredients just indicated. More specifically, I mix 1 chemical equivalent of zinc chloride (68 parts by weight), 1 chemical equivalent of magnesium chloride hexahydrate (101 parts by weight), 2 chemical equivalents of potassium chloride (150 parts by weight), 1 chemical equivalent of copper sulphate crystals (125 parts by weight), and a bulk of plaster of Paris equal to the bulk of the ingredients just specified. Good results however can be had when the ingredients are varied within the following limits: 1/100 to 10 chemical equivalents of slowly volatile chloride or chlorides; 1 chemical equivalent of finely divided metallic copper or chemically combined copper; inert material and cementing material up to 25 times the bulk of all other ingredients.

By the phrase slowly volatile chloride I refer to a chloride which is slowly volatile when compared to ammonium chloride.

In preparing the composition the ingredients are mixed with a quantity of water sufficient to form a stiff paste of such consistency as to allow it to be shaped into pellets, briquettes, etc.

The inert material and cementing material and the shaping of the composition of matter into lumps may be omitted in some cases where a cheaper product is desired, but then the composition is less efficient.

Altho I have set forth a preferred embodiment of my invention and various details and equivalents pertaining thereto, I do not wish to limit myself to it exactly, but include such modifications as will occur and be within the scope of the invention and of the claims.

This composition of matter is to be distinguished from those producing colored flames commonly used for signalling, pyrotechnics, and the like in that the latter contain combustible material and an oxidizing agent. My invention differs from any such composition in that neither a combustible ingredient nor oxidizing agent is required. Small amounts of combustible material and oxodizing agents might be present in my composition of matter without particularly departing from the spirit of my invention, but if present in significant amounts, their presence would cause a rapid exhaustion of the composition as regards its ability to color a flame for a considerable period of time and thereby defeat the chief object of my invention.

I claim:

1. A composition of matter adapted to producing a colored flame comprising 4 chemical equivalents of slowly volatile chloride or chlorides; 1 chemical equivalent of metallic copper or chemically combined copper; and a bulk of plaster of Paris equal to the bulk of all other ingredients.

2. A composition of matter consisting of a mixture of 68 parts by weight of zinc chloride; 101 parts by weight of hydrated magnesium chloride; 150 parts by weight of potassium chloride; 125 parts by weight of hydrated copper sulphate; and 300 parts by weight of plaster of Paris.

3. A pyrotechnic article of manufacture comprising flame colorant fashioned into a coherent mass which is non-flammable and as a whole non-combustible.

4. A pyrotechnic article of manufacture comprising flame colorant material, and inert material fashioned into a lump which is sufficiently free from combustible matter to be non-flammable and as a whole non-combustible.

5. A pyrotechnic article of manufacture comprising flame colorant, and halide in chemical excess of the colorant, the article being sufficiently free from combustible matter to be non-flammable and as a whole non-combustible.

6. A pyrotechnic unitary article of manufacture comprising halide adherent to flame colorant material, the halide being in chemical excess of the colorant and the article being non-flammable and as a whole non-combustible.

7. A pyrotechnic article of manufacture comprising a mixture of halides of differing volatility and copper, the article being non-flammable and as a whole non-combustible.

8. A pyrotechnic article of manufacture comprising a mixture of halides coherent with flame colorant material and inert material, the article being sufficiently free from combustible matter to be non-flammable and as a whole non-combustible.

9. A pyrotechnic article of manufacture comprising a mixture of halides of which one is slowly volatile, flame colorant, inert material, and bonding agent, fashioned into a coherent mass which is non-flammable and as a whole non-combustible.

10. A process of coloring flames comprising applying to burning substance coherent units which as a whole are non-combustible and non-crystalline and contain material comprising flame colorant.

11. The step in the process of manufacturing a non-flammable pyrotechnic article whereby flame colorant material is made adherent to halide in chemical excess of the colorant.

12. The step in the process of manufacturing non-flammable pyrotechnic units whereby flame colorant is made coherent in contact with halide in chemical excess of the colorant and inert ingredient.

13. A pyrotechnic article of manufacture comprising flame colorant coherent with a mixture of halides.

14. A process of coloring flames comprising applying to burning substance unitary lumps which as a whole are non-combustible and non-crystalline and coherent with material comprising flame colorant, inert material, and halide.

15. A pyrotechnic article of manufacture which is non-flammable and non-combustible comprising solid flame colorant particles stuck together with a binder.

16. The step in the process of manufacturing a non-flammable and non-combustible flame colorant mass, wherein solid flame colorant material is made coherent by a binder.

17. A flame colorant unit operative by burning embers, which as a whole is non-flammable, non-crystalline and comprises flame colorant ingredient coherent and in contact with admixed halide.

18. The process comprising compacting substantially dry flame colorant and halide into a discrete unit and applying the unit to embers.

HERBERT GILES TANNER.